United States Patent [19]

Nakano

[11] Patent Number: 5,388,190
[45] Date of Patent: Feb. 7, 1995

[54] PROGRAMMABLE CONTROLLER WITH FUZZY CONTROL FUNCTION, FUZZY CONTROL PROCESS AND FUZZY CONTROL MONITORING PROCESS

[75] Inventor: Nobumasa Nakano, Aichi, Japan

[73] Assignee: Mitsubishi Denki Kabushiki Kaisha, Tokyo, Japan

[21] Appl. No.: 100,366

[22] Filed: Aug. 2, 1993

Related U.S. Application Data

[60] Division of Ser. No. 982,125, Nov. 25, 1992, Pat. No. 5,261,036, which is a continuation of Ser. No. 602,535, Oct. 24, 1990, abandoned.

[30] Foreign Application Priority Data

Oct. 24, 1989 [JP] Japan .................. 1-276401

[51] Int. Cl.$^6$ .............................................. G06F 9/44
[52] U.S. Cl. .................................. 395/61; 395/11; 395/900
[58] Field of Search ................... 395/11, 900, 61; 364/131-139

[56] References Cited

U.S. PATENT DOCUMENTS

| | | | |
|---|---|---|---|
| 4,819,149 | 4/1989 | Sanik et al. | 364/132 |
| 4,858,101 | 8/1989 | Stewart et al. | 364/131 |
| 5,008,805 | 4/1991 | Fiebig et al. | 364/132 |

OTHER PUBLICATIONS

Hierarchical, Distributed Digital Control in the Municipal Wastewater Industry; Proc of 1979 Joint Automatic Control Conf; Amer Inst Engrs (AIChE); M. J. Flanagan; pp. 431-436.
Fuzzy Control of Large Scale Systems; Large Scale Systems Theory and Applications; (IFAC Proceedings Series-1984, No. 10); Pergamon Press; Tu et al; pp. 145-150.

*Primary Examiner*—Allen R. MacDonald
*Assistant Examiner*—Robert W. Downs
*Attorney, Agent, or Firm*—Sughrue, Mion, Zinn, Macpeak & Seas

[57] ABSTRACT

A process for monitoring fuzzy control information of a programmable controller having a fuzzy control function and at least one input converting module and/or output converting module by using a fuzzy control monitoring device. This process includes the steps of defining fuzzy membership functions, fuzzy output functions and/or fuzzy result functions using a format comprising a plurality of points, and storing data representing these functions in at least one of the input converting modules and/or output converting modules. Data is generated which includes first fuzzy grade numbers, second fuzzy grade numbers and/or a composite fuzzy set based on the functions. The process further includes the step of monitoring production of the generated data by using the monitoring device. Another control monitoring process of the invention includes the steps of connecting a plurality of programmable controllers comprising at least an input converting module and/or an output converting module, by a network, and storing at least one fuzzy control function in at least one of the input converting modules and/or output converting modules. The process further includes the step of monitoring the fuzzy control information of the plurality of programmable controllers using a single fuzzy control monitoring device coupled to the network.

2 Claims, 11 Drawing Sheets $$y_1 = \frac{\frac{h}{2}}{\frac{\ell_2 + \ell_3}{2} - \ell_1}(x - \ell_1)$$

$$y_2 = \frac{h}{\ell_2 - \frac{\ell_1 + \ell_3}{2}}\left(x - \frac{\ell_1 + \ell_3}{2}\right)$$

x COORDINATE IF $y_1 = y_2$ $$x = \frac{1}{3}(\ell_1 + \ell_2 + \ell_3)$$

$$S = \frac{1}{2}(\ell_3 - \ell_1)h$$

$$x_1 = \frac{\ell_2}{2}, \quad S_1 = \ell_2 h$$

$$x_2 = \frac{1}{3}(2\ell_2 + \ell_3), \quad S_2 = \frac{1}{2}(\ell_3 - \ell_2)\cdot h$$

$$x = \frac{\frac{1}{3}(\ell_2^2 + \ell_2\ell_3 + \ell_3^2)}{\ell_2 + \ell_3}, \quad S = \frac{h}{2}(\ell_2 + \ell_3)$$

$S = S_1 + S_2$ $S_1 (x - \ell_1) = S_2(\ell_2 - x)$ $x = \dfrac{S_1 \ell_1 + S_2 \ell_2}{S_1 + S_2}$

| RULE | | | | | |
|---|---|---|---|---|---|
| R1 | IF | A11 | AND | A12 | THEN | A1 |
| R2 | IF | A21 | AND | A22 | THEN | A2 |
| Ri | IF | Ai1 | AND | Ai2 | THEN | Ai |
| Rn | IF | An1 | AND | An2 | THEN | An |

PROGRAMMABLE CONTROLLER WITH FUZZY CONTROL FUNCTION, FUZZY CONTROL PROCESS AND FUZZY CONTROL MONITORING PROCESS

This is a divisional application of application Ser. No. 07/982,125, filed Nov. 25, 1992, which issued on Nov. 9, 1993 as U.S. Pat. No. 5,261,036 and was a file-wrapper continuation application of application Ser. No. 07/602,535, filed on Oct. 24, 1990, now abandoned.

BACKGROUND OF THE INVENTION

1. Field of the Invention

The present invention relates to a programmable controller having a fuzzy control function, which performs fuzzy control on an analog data input, the fuzzy control process thereof and a fuzzy control monitoring process.

2. Description of the Prior Art

Recently, in the control field, control systems to which fuzzy logic principles are applied have been the subject of intense research and development.

FIG. 11 is a diagram (a descriptive representation of a fuzzy-control machine tool) showing the configuration of a prior art fuzzy controller. See "Fuzzy Expert System Configuring Tool Having Real-Time Control Functions", pp. 60–63, Mitsubishi Electric Technical Information Vol. 63, No. 3. In FIG. 11, numeral 10 indicates a fuzzy controller, 20 a system to be controlled by the fuzzy controller, and 30 a setting/monitoring device electrically connected to the controller 10 for setting therein the fuzzy membership functions (hereinafter referred to as "membership functions") and fuzzy control application software, and for monitoring the control operation. The fuzzy controller 10 comprises a general-purpose, high-speed CPU, such as a digital signal processor (DPS), and is composed of an inference engine 11 for making inferences, an A/D converter 12 for converting input analog data into digital data, a D/A converter 13 for converting digital data into analog data and outputting the result, a memory 14 for storing a plurality of membership functions and fuzzy output functions as parameter values and for storing application programs as application software for fuzzy inferences, the setting/monitoring device 30, and a line controller 15 for connecting the fuzzy controller 10.

FIG. 12 shows an example of a fuzzy control application program stored in the memory 14 and executed in the inference engine 11. FIGS. 13a to c show examples of A/D-converted inputs and the conversion thereof into fuzzy grade numbers using a plurality of membership functions, as part of an inferencing process in accordance with the fuzzy control application program example shown in FIG. 12, and a defuzzed inference output, discussed hereafter. FIG. 14 is a flowchart of the fuzzy control process in accordance with the fuzzy control application program shown in FIG. 12.

Operation will now be described using FIG. 14 on the assumption that the fuzzy application program shown in FIG. 12 has been written to the memory 14 in FIG. 11. The inference engine 11 reads the said application program from the memory 14 one line at a time and executes it on a line-by-line basis. The contents of rule R1 on line one are as follows:

if A11 and A12 then B1

The "and" in rule R1 is a minimizing operation for selecting the smaller one of first fuzzy grade numbers A11 and A12. The operation result of the above conditional statement, A1, is also a fuzzy grade number. Hereinafter A11, A12, etc., are referred to as first fuzzy grade numbers and A1, etc., as second fuzzy grade numbers. The inference engine 11 will interpret the above rule R1 and first find the first fuzzy grade number A11.

To find the first fuzzy grade number A11, a fuzzy inference process is started at step 500 in the flowchart shown in FIG. 14. The inference engine 11 reads and interprets, at step 501, the first rule Ri (i=1). At step 502, the inference engine inputs from the controlled object a value x1, via the A/D converter 12, converts the same into a first fuzzy grade number by means of membership function a11 corresponding to A11 shown in FIG. 13a, and finds $A11=a11(x1)=0.6$. Then, to obtain the first fuzzy grade number A12, the inference engine 11 inputs a value x2 via the A/D converter 12, converts the same into a fuzzy grade number by means of membership function a12 corresponding to A12 shown in FIG. 13b, and finds $A12=a12(x2)=0.90$. At step 503, the inference engine 11 then performs the following fuzzy operation on the obtained fuzzy grade numbers A11 and A12 and finds the second fuzzy grade number A1, i.e., obtains the second fuzzy grade number $A1=0.60$ from the following expression:

$$A11 \text{ and } A12 = A1 = 0.60 \text{ and } 0.90 = 0.60$$

Then, at step 504, the inference engine 11 performs the following implication operation:

A1 B1 for the above obtained value A1 (=0.60) using a fuzzy membership output function B1 (hereinafter referred to as a "fuzzy output function") which is different from the previously mentioned membership functions. The " " in the above implication operation A1 B1 contracts the fuzzy output function B1 at the same ratio as the value of the second fuzzy grade number A1. Since A1=0.60 in this case, the fuzzy set which is the result of the implication operation is a reduction of the whole fuzzy output function B1 at a ratio of 1 to 0.6. This operation result is shown by a hatched area in FIG. 13C.

The inference engine 11 then judges, at step 505, whether processing of all rules R1 to Rn is complete. If so, the processing will progress to step 507. Since the processing is not yet complete in this example, the inference engine 11 reads the next rule, i.e., the rule R2 on line two, from the memory 14 and interprets its contents at step 506, and returns to step 502. The contents of line two read:

if A21 and A22 then B2

The inference engine 11 now works membership functions a21 and a22 in accordance with the previously found x1 and x2 and obtains first fuzzy grade numbers 0.75 (from a21(x1)) and 0.50 (from a22(x2)), from which second fuzzy grade number A2 is obtained by the following expression:

$$A21 \text{ and } A22 = A2 = 0.75 \text{ and } 0.50 = 0.50$$

The inference engine 11 then works the above obtained value A2 on fuzzy output function B2 and performs the following operation:

A2 B2

Since A2=0.50, the operation result is a reduction of the whole fuzzy output function B2 at a ratio of 0.50. This operation result is also illustrated in FIG. 13c (the triangle defined by dashed lines). Hereinafter, by repeating step 506 and steps 502 through 505 as mentioned above, the inference engine 11 reads the remaining rules R3 (on line three) to Rn (on line n) in order, performs processing similar to that of rules R1 and R2, and as a result, obtains "n" pieces of inference output comprising A1   B1 to An   Bn.

Then, at step 507, the inference engine 11 carries out a fuzzy composition process which composes all of the above implication operation result, i.e., calculates the center of gravity of the overlapped inference outputs, i.e., the figures in FIG. 13c enclosed by a bottom coordinate axis (y axis) and both vertical axes (grade coordinate axes). In the present example this is done for values of the above indicated A1    B1 and A2    B2, resulting in a y axis value (in %) as a defuzzy value. At step 508, the above defuzzy value is converted into an analog value by the D/A converter 13 and provided as output y.

By repeating the above steps at predetermined intervals, fuzzy control is carried out on the system 20 to be controlled.

In the above mentioned process, the membership functions a11 to a21, the fuzzy output functions B1 to Bn, and the rules R1 to Rn are all stored in the memory 14 by the setting/monitoring device 30 via the line controller 15. The values of the figures (the results of the implication operations A1    B1 to An    Bn) are also monitored, by specifying a whole or part thereof, by the setting/monitoring device 30 via the line controller 15. As is apparent from the flowchart shown in FIG. 14, since the prior art fuzzy controller 10 employs only one inference engine 11 to execute a succession of processes, in series, which are composed of the fuzzy grade number operations (step 502), the minimum value operation (step 503) and the implication operations (step 504), a comparatively long time is needed to perform the processes from input to output. In the first fuzzy grade number conversion by means of the membership function aij, therefore, a table reference system (i.e., a look-up table) is used to reduce the processing time, i.e., tabulated membership functions are stored in the memory 14 beforehand. As an example, if 10 types of 10 membership functions alj are input, each of 256-division accuracy, a memory capacity of:

$$1 \text{ byte} \times 256 \times 10 \times 10 = 25.6 \text{KB}$$

is required and a large area is necessary for the table memory. Similarly, the fuzzy output functions B1 are also tabulated and stored in the memory 14 beforehand, and also require a large area for the table memory.

The fuzzy controller 10 of the prior art configured as described above has problems in that the fuzzy inference operation takes a relatively long time because it is executed in series by one inference engine 11, and in that since a table reference system must be used to reduce the processing time of the fuzzy grade number conversion by way of the membership functions, a comparatively large memory area is required. Moreover, since the fuzzy controller is designed as a dedicated controller, the wiring and connections become complicated in the monitoring of the fuzzy control results when employing a general-purpose controller, such as a programmable controller, resulting in extra cost and loss of time.

SUMMARY OF THE INVENTION

It is accordingly an object of the present invention to resolve the aforementioned problems in the prior art by providing a programmable controller having a fuzzy control function and using a fuzzy control process and performing a fuzzy control monitoring process, which can process the required fuzzy control functions in a comparatively short time, requires a relatively small memory area for fuzzy control, eliminates extra cost and loss time, and can easily monitor the fuzzy control results.

The fuzzy control process of the invention operates to convert input analog data into digital data, converts the digital data into first fuzzy grade numbers using fuzzy membership functions defined in a definition format composed of a plurality of points, executes fuzzy operation processing instructions as sequence instructions operating on the first fuzzy grade numbers, generates fuzzy sets corresponding to second fuzzy grade numbers which are the execution results of the fuzzy operation processing instructions, using fuzzy output functions defined in a definition format composed of a plurality of points, and defuzzes the fuzzy sets, and converts the defuzzed data into analog data for output. Defuzzing is conducted by finding the moment of each result function, wherein the area of each fuzzy result function is used as the magnitude and the center of the area is used as a coordinate value, and obtaining a defuzzy value by the composite of said moments.

A programmable controller having a fuzzy control function according to the invention comprises an A/D converter for converting input analog data into digital data, a CPU for executing sequence instructions, and a D/A converter for converting digital data into analog data and outputting the analog data, the said A/D converter including fuzzy membership function storing means for storing fuzzy membership functions and fuzzy grade number means for determining first fuzzy grade numbers corresponding to the digital data using the fuzzy membership functions, the CPU having a fuzzy operation processing instruction executing means for receiving the fuzzy grade numbers, for executing fuzzy operation processing instructions as the sequence instructions, and for outputting second fuzzy grade numbers, one of the CPU and the D/A converter having a fuzzy output function storing means for storing fuzzy output functions and fuzzy result function means for determining fuzzy sets using the fuzzy output functions and for outputting the results as fuzzy result functions, the D/A converter including defuzzing means for composing a plurality of the fuzzy result functions and for defuzzing the composite fuzzy set, and at least one of the fuzzy membership functions, fuzzy output functions and fuzzy result functions being defined in a definition format composed of a plurality of points.

The fuzzy control monitoring process for a programmable controller having a fuzzy control function according to the invention monitors, by means of a fuzzy control monitoring device, the fuzzy control information of a programmable controller having a fuzzy control function, including at least one of fuzzy membership functions, fuzzy output functions and fuzzy result functions defined in a definition format composed of a plurality of points, and at least one of first fuzzy grade numbers, and second fuzzy grade numbers and a composite fuzzy set generated using the aforementioned functions.

The fuzzy control monitoring process may use a single fuzzy control monitoring device to monitor the fuzzy control information of a plurality of programmable controllers having a fuzzy control function, via a network.

According to the invention, input analog data is converted into digital data, and then converted into first fuzzy grade numbers using fuzzy membership functions defined in a format composed of a plurality of points. The fuzzy operation processing instructions are executed as sequence instructions using the first fuzzy grade numbers, and fuzzy sets are generated using second fuzzy grade numbers, which are the execution results of the fuzzy operation processing instructions, and fuzzy output functions defined by a plurality of points. The fuzzy sets are defuzzed, converted into analog data, and then output.

In the invention, fuzzy membership function storing means stores fuzzy membership functions, fuzzy grade number generating means produces first fuzzy grade numbers from input data converted into digital data, using the fuzzy membership functions, fuzzy operation processing instruction execution means executes fuzzy operation processing instructions using the first fuzzy grade numbers and outputs second fuzzy grade numbers, fuzzy output function storing means generates fuzzy sets using the second fuzzy grade numbers and fuzzy output functions, and outputs the results as fuzzy result functions. The defuzzing means composes a plurality of fuzzy result functions and defuzzes the composite fuzzy set.

Fuzzy rule setting means sets the fuzzy rules in the application program, and fuzzy rule selecting means causes selectively execution of the fuzzy rules through the use of logical contacts in the said application program.

A first CPU may execute fuzzy operation instructions and a second CPU may execute sequence instructions other than fuzzy operation instructions, according to the invention.

BRIEF DESCRIPTION OF THE DRAWINGS

In the above figures, reference characters in the different views identify identical or corresponding parts.

DESCRIPTION OF THE PREFERRED EMBODIMENTS

Figure 1:
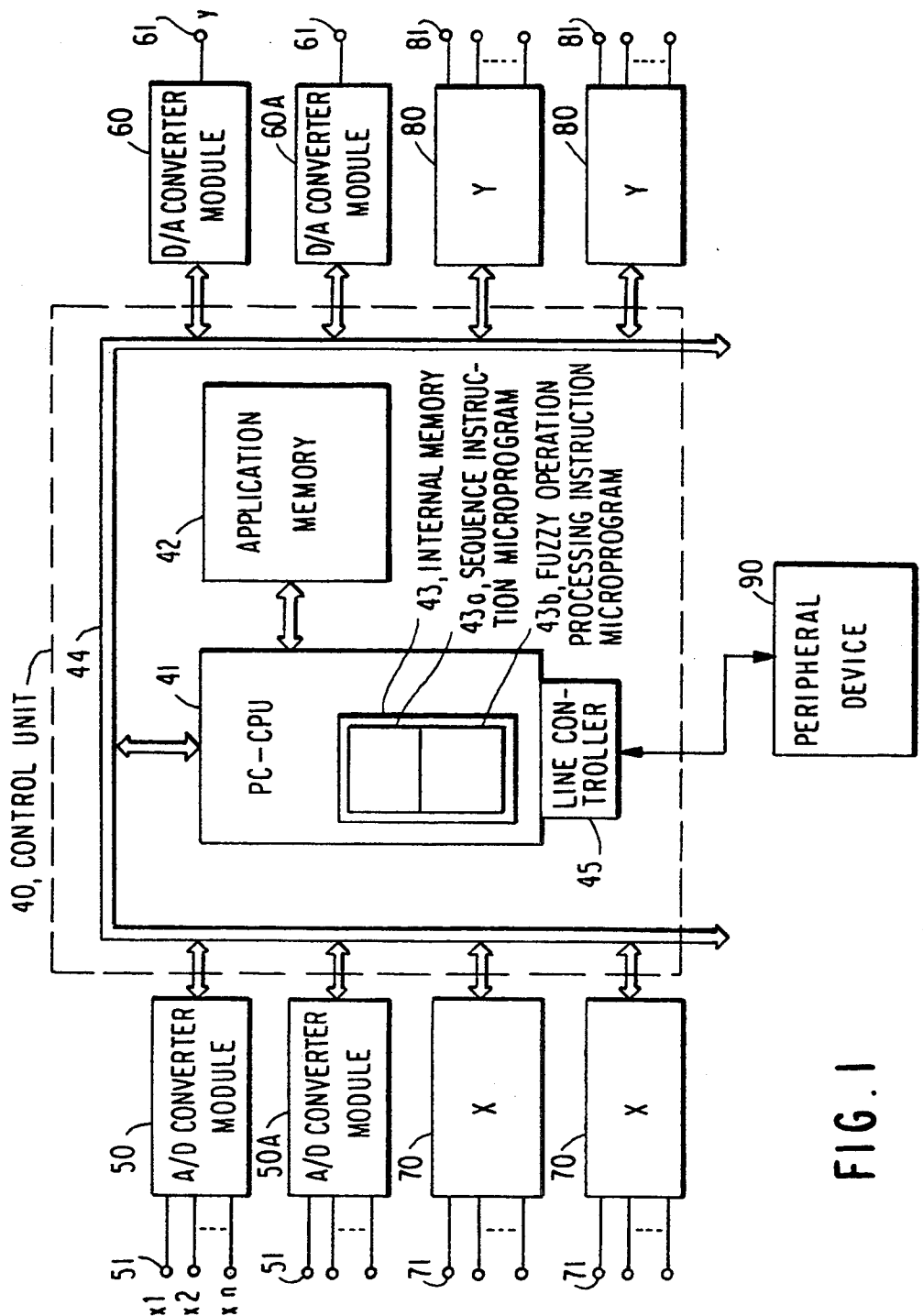
FIG. 1 is a block diagram of a programmable controller having a fuzzy control function according to an embodiment of the invention.

Referring now to the drawings, wherein like reference characters designate like or corresponding parts throughout the several views, embodiments of the invention will be described according to FIGS. 1 through 10.

FIG. 1 is a block diagram illustrating the configuration of a programmable controller having a fuzzy control function (hereinafter referred to as the "PC"). In FIG. 1, the numeral 40 indicates a controller unit containing a CPU 41 (hereinafter referred to as the "PC-CPU") as its major component. Numeral 42 refers to an application memory used as a storage for application programs comprising any combination of user-prepared sequence instructions and fuzzy inference instructions. An internal memory 43 of the PC-CPU 41 comprises a sequence instruction execution processor 43a identical to that of the prior art and an added fuzzy inference instruction execution processor 43b. The PC-CPU serves as a fuzzy operation processing instruction executing means, and functions to execute the fuzzy inference instructions. A line controller 45 connects a peripheral device 90 (described later) and the PC-CPU 41. An A/D converter module 50, connected to the PC-CPU by an I/O bus 44, converts input analog values into digital values, then converts the results into first fuzzy grade numbers. The A/D converter module 50 has the same hardware configuration as the prior art A/D converter module, and stores fuzzy membership functions (hereinafter referred to simply as "membership functions"). Unit 50 performs the grade number converting function using the membership functions, and is different from the prior art A/D converter module 50A. Input terminals 51 of the A/D converter module 50 receive analog input signals x1 to xm. A D/A converter module 60 operates as a D/A converter and also defuzzes a fuzzy inference result received from the controller unit 40, i.e., derives a defuzzy value and converts it from digital form into an analog value, and outputs the analog value. The D/A converter module 60 has the same hardware configuration as the prior art D/A converter module, but stores fuzzy output functions and has a defuzzy conversion function. It is different from the prior art D/A converter module 60A.

Output terminals 61 provide analog signal y as a fuzzy control output. Digital input module 70 and digital output module 80 resemble those of an ordinary programmable controller, and have digital signal input terminals 71 and digital signal output terminals 81, respectively. Numeral 90 indicates a peripheral device of the PC-PCU 41 used for writing user application programs to the application memory 42, for modification thereof, and for monitoring, etc., of the instruction execution status of the PC-CPU 41 via the line controller 45. The peripheral 90 carries out, via the PC-CPU 41, the writing and modification of fuzzy inference instructions, in addition to the usual sequence instructions of the prior art, the setting of membership functions to the A/D converter module 50, the setting of fuzzy output functions to the D/A converter module 60, and monitoring.

Figure 2A:
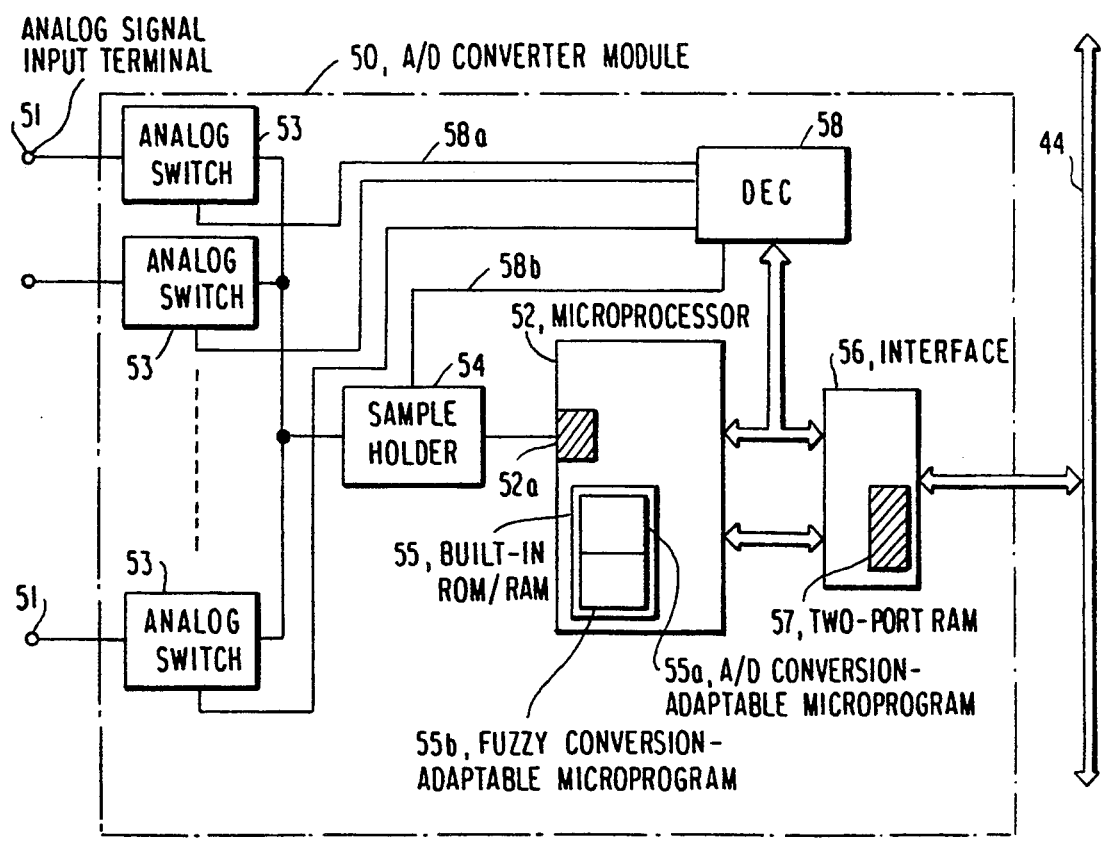
FIG. 2 is a block diagram illustrating the details of an A/D converter module shown in FIG. 1.

FIG. 2a is a block diagram illustrating the details of the A/D converter module 50. In FIG. 2a, numerals 51 indicate the analog signal input terminals, and 52 a built-in microprocessor (hereinafter referred to as the "$\mu$-P") having an analog port 52a for A/D conversion. Numerals 53 indicate analog switches, and 54 is a sample holder, to which an input analog signal is output when any of the analog switches 53 is selectively switched on by the output signal 58a of a decoder 58 which will be described later. The sample holder 54 holds the input analog signal for a predetermined period of time in accordance with output signal 58b of the decoder 58 and then outputs the same to the analog port 52a of the $\mu$-P 52. The $\mu$-P 52 is a general-purpose processor containing an A/D conversion function, and has a built-in ROM/RAM 55. The built-in ROM/RAM 55 includes a prior art A/D conversion microprogram 55a with a non-linear compensation function and a fuzzy conversion microprogram 55b. The $\mu$-P serves the functions of: (1) an A/D converter, converting analog signals input from the input terminals 51 into digital signals and (2) a fuzzy grade conversion means for converting the digital values into first fuzzy grade numbers using the membership functions. An interface 56 (hereinafter referred to as the "I/F") serves as an output area of the A/D converter module 50 and includes a two-port RAM 57 as a two-port storage. The two-port RAM 57 allows data to be transferred to and from the $\mu$-P 52 and to and from the PC-CPU 41 over the I/O bus 44. In addition to its function as a storage means for the usual A/D converter module, the two-port RAM 57 includes a fuzzy function storing area 57a (see FIG. 2b) for storing coordinate points that define the membership functions (in this embodiment, each membership function is defined by three points on orthogonal coordinate axes), and a fuzzy grade number storing area 57b. Analog input signals are converted into digital signals, and then conversion into first fuzzy grade numbers takes place by means of the membership functions, and the results are stored here. Namely, the two-port RAM 57 serves as a fuzzy grade number storing means for storing first fuzzy grade numbers accessible by/from the PC-CPU 41 of the controller unit 40, and as a storage means for membership functions, as defined by a format composed of a plurality of points (three points in the foregoing example). A decoder 58 (hereinafter referred to as the "DEC") closes any of the open analog switches 53 by decoding a command from the $\mu$-P 52, and directs a command to the sample holder 54 so as to temporarily hold the analog value input via the closed analog switch 53.

Figure 3A:
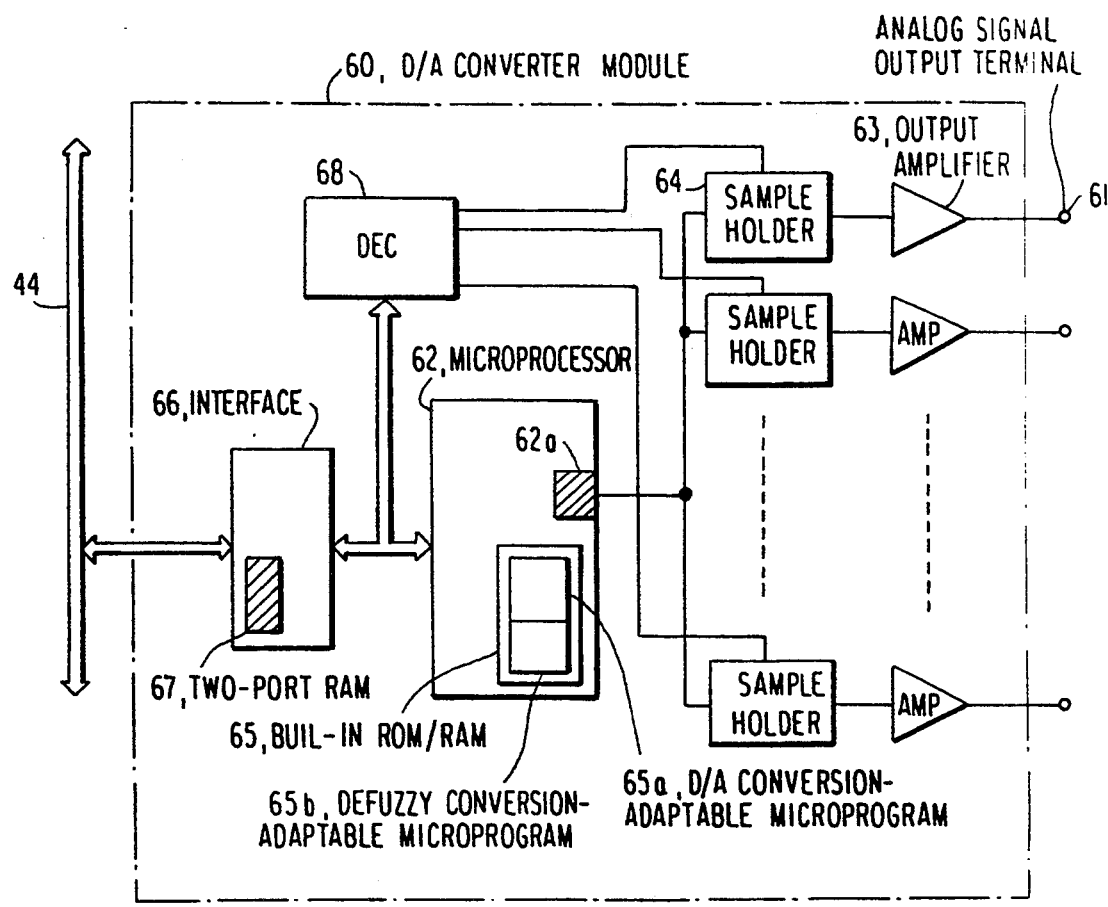
FIG. 3 is a block diagram illustrating the details of a D/A converter module shown in FIG. 1.
Figure 3B:
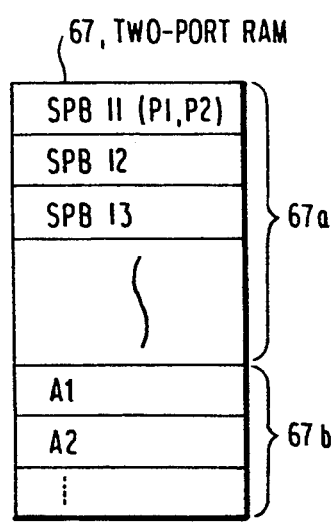

FIG. 3a is a block diagram illustrating the details of the D/A converter module 60. In FIG. 3a, numeral 61 indicate analog output terminals, and 62, a built-in microprocessor (hereinafter referred to as the "$\mu$-P") having an analog port 62a, for D/A conversion. Output amplifiers are shown at 63m and at 64 are sample holders. The analog value output from the $\mu$-P 62 is temporarily held by the sample holders 64, converted to low impedance and output by the output amplifiers 63. The $\mu$-P 62 has a built-in ROM/RAM 65 which includes a prior art D/A conversion microprogram 65a and a defuzzy conversion microprogram 65b. An interface 66 (hereinafter referred to as the "I/F") between the I/O bus 44 of the PC-CPU 41 and the D/A converter module 60 has a two-port RAM 67 to allow data to be transferred to/from $\mu$-P 62. In addition to functioning as a storage means as in the case of an ordinary D/A converter module, the two-port RAM 67 has, as shown in FIG. 3a, a fuzzy output function storing area 67a for storing coordinate points that define fuzzy output functions (in this embodiment, one fuzzy output function is defined by three points on orthogonal coordinate axes), and a fuzzy output storing area 67b for storing second fuzzy grade numbers transferred from the PC-CPU 41. A decoder 68 (hereinafter referred to as the "DEC") closes any of the open sample holders 64 by decoding a command from the $\mu$-P 52.

Figure 4:
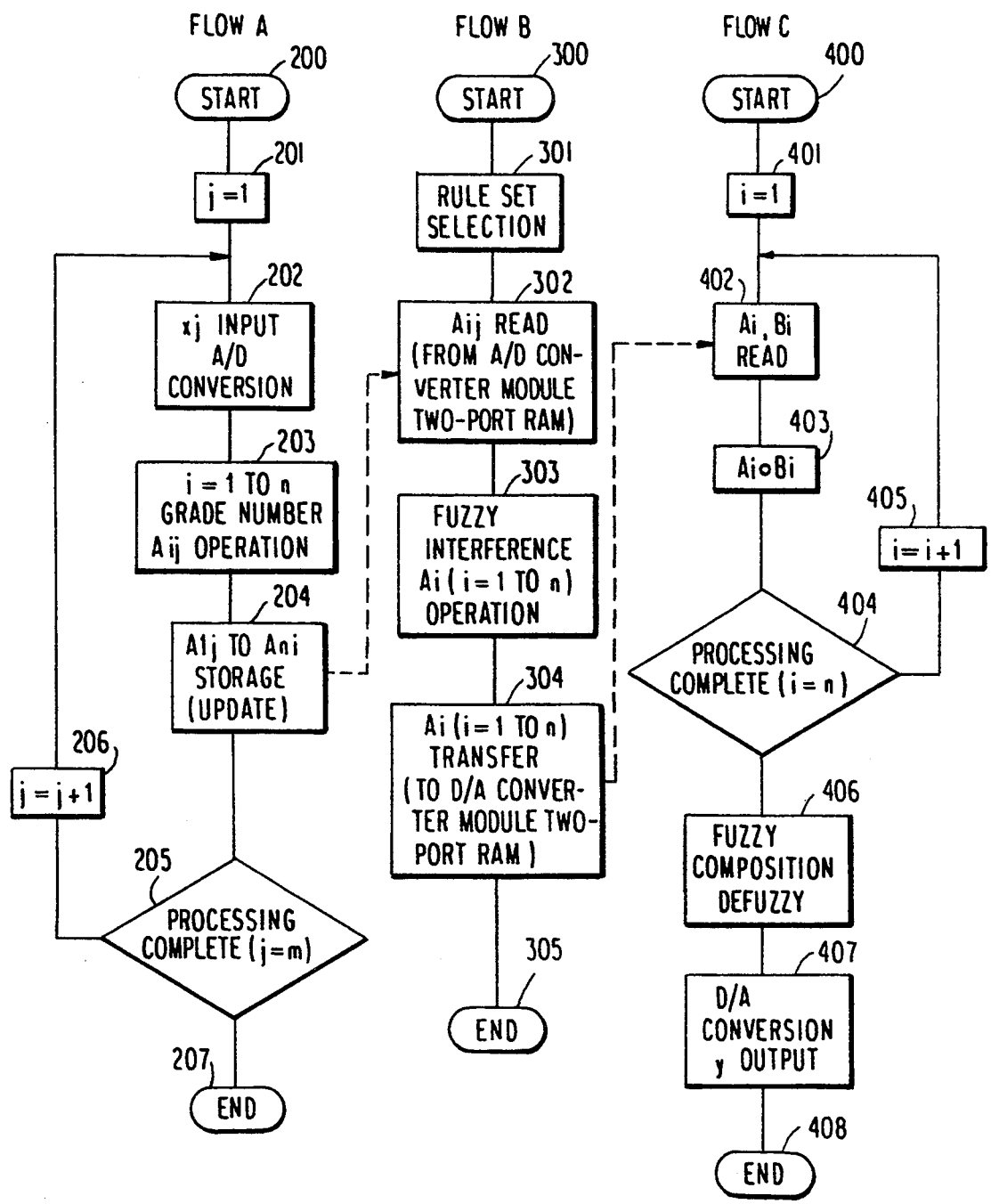
FIG. 4 is a flowchart illustrating operations of the fuzzy control programmable controller shown in FIG. 1.

FIG. 4 is a flowchart illustrating the operation of the PC shown in FIG. 1. Flow A indicates the operation of the A/D converter module 50, flow B that of the controller unit 40, and flow C that of the D/A converter module 60. The details of the processing will be hereafter described.

Figure 5C:
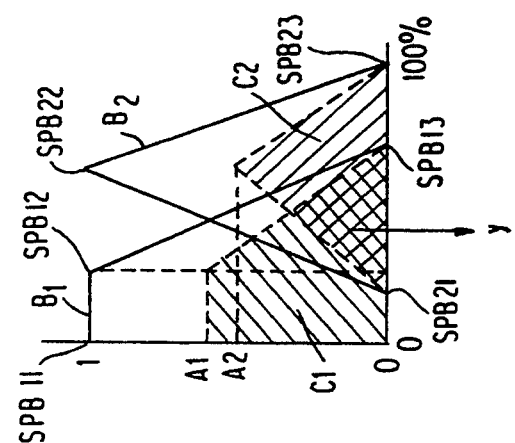
FIG. 5c is an illustrative diagram of an implication operation carried out in the D/A converter module shown in FIG. 3.
Figure 5B:
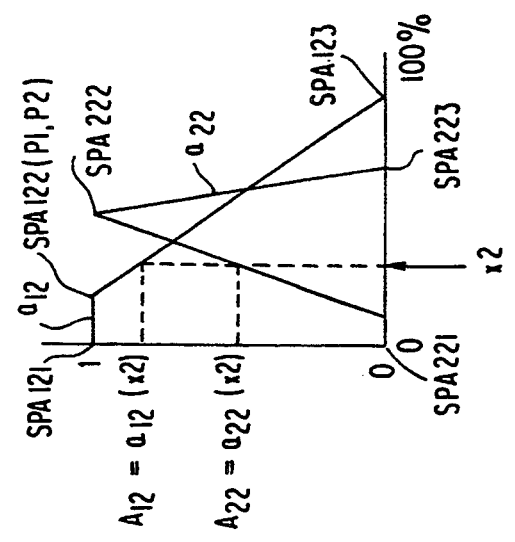
FIGS. 5a and b are illustrative diagrams of a first fuzzy grade number operation which takes place in the A/D converter module shown in FIG. 2.
Figure 5A:
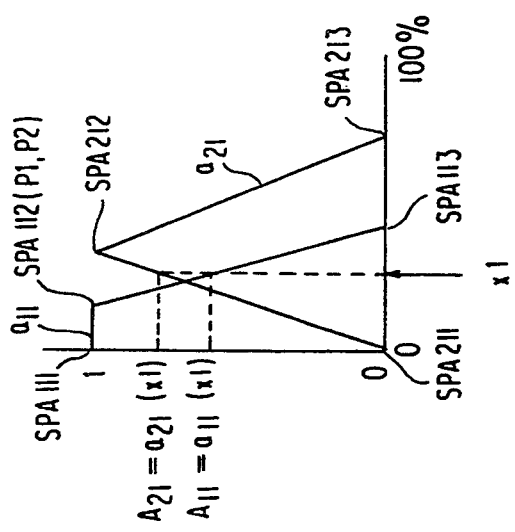

FIG. 5a and b are illustrative diagrams of the operations performed on the first fuzzy grade numbers obtained in correspondence with input data x1, x2 converted into digital values, using the membership functions defined in the three point format, in the A/D converter module 50 shown in FIG. 2. FIG. 5c is an illustrative diagram of the performance of the implication operation on the second fuzzy grade numbers input from the controller unit 40, using the fuzzy output functions defined in the three point format, in the D/A converter module 60.

Figure 6:
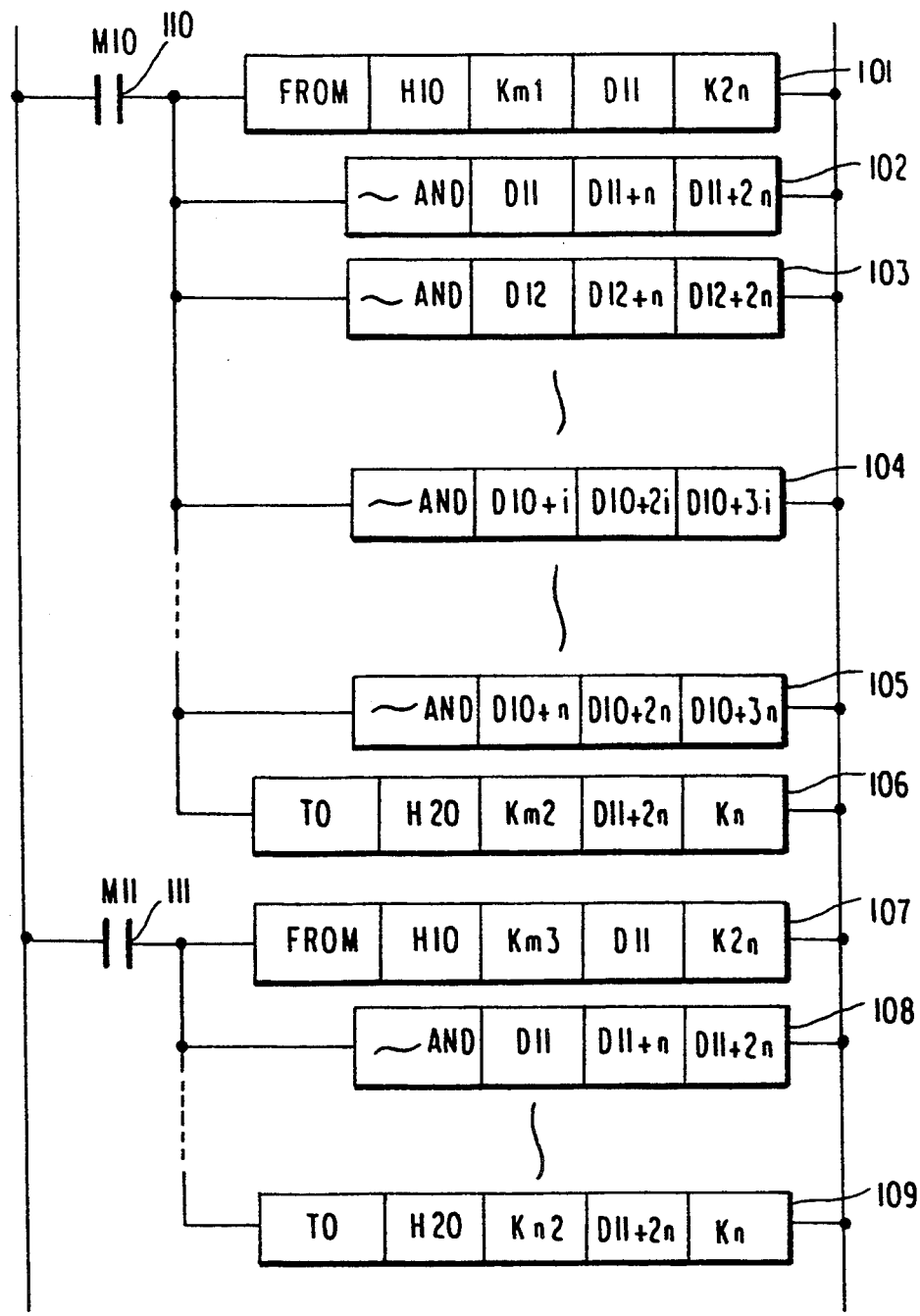
FIG. 6 is a ladder diagram illustrating an example of an application program for executing fuzzy operation processing instructions.

FIG. 6, as described in more detail hereinafter, shows a portion of an application program example, in ladder form, relating to a fuzzy inference function executed by the PC-CPU 41 shown in FIG. 1.

The operation of the foregoing system will now be described, with reference to FIGS. 1-6. Prior to performing control, a plurality of coordinate points (coordinate data) defining the predetermined membership functions are stored in the two-port RAM 57 (FIG. 2a) inside the A/D converter module 50, via the line controller 45 (FIG. 1) and I/O bus 44 of the controller unit 40, using the peripheral device 90 in FIG. 1. In a similar way, coordinate data defining the predetermined fuzzy output functions are stored in the two-port RAM 67 (FIG. 3a) inside the D/A converter module 60. For both the membership and output functions, each function is defined by three coordinate points in this embodiment.

In FIG. 5a, a11 and a21 are prepared as membership functions for x1 input from the analog input terminal 51 of the A/D converter module 50 (FIG. 1), and are given as a combination of points having coordinate values of the form (P1, P2), in an orthogonal coordinate system. The vertical axis is defined as the grade number, ranging between 0 and 1 {0, 1} and the horizontal axis is defined as the input percentage, ranging from 0 to 100% {0, 100}. In this embodiment, the function a11 is defined by three definition points SPA111, SPA112 and SPA113, and the function a21 is defined by definition points SPA211, SPA212 and SPA213, all of which are stored in the two-port RAM 57. Similarly, in FIG. 5b, a12 and a22 are prepared as membership functions for analog input x2, the function a12 being defined by points SPA121, SPA122 and SPA123, and the function a22 by points SPA221, SPA222 and SPA223 in this embodiment, the functions being stored in the two-port RAM 57.

In FIG. 5c, fuzzy output functions B1 and B2 are used to produce the analog output y which will be output from the analog output terminal 61 of the D/A converter module 60 (FIG. 1). Functions B1 and B2 are given as a combination of orthogonal coordinates, wherein the vertical axis is defined as an output fuzzy value, ranging from 0 to 1 {0, 1} and the horizontal axis is defined as the output percentage, ranging from 0 to 100% {0, 100}. In this embodiment, the function B1 is defined by the three definition points SPB11, SPB12 and SPB13, and the function B2 by the points SPB21, SPB22 and SPB23, with the functions being stored in two-port RAM 67 (FIG. 3).

Operations will now be described according to the flowchart shown in FIG. 4. In flow A, the A/D converter module 50 is started up at step 200, and initialized (J=1) at step 201. The $\mu$-P 52 then inputs the first analog signal xj (j=1) and converts it into a digital value at step 202. At step 203, the $\mu$-P 52 then reads membership functions aij (i=1 to n) (i.e., a11 and a21 in this example) corresponding to the A/D-converted input signal xj (j=1) from the two-port RAM 57, finds the first fuzzy grade numbers Aij (i.e., A11(x1) and A21(x1) in this example) corresponding to each membership function aij (i.e., converts the input xj into a grade number Aij) using the membership functions aij, and at step 204, writes the first fuzzy grade numbers A1j through Anj to a predetermined area of the two-port RAM 57. Then, at step 205, the $\mu$-P 52 judges whether the above operation is complete or not for all input signals xj (j=1 to m; m=2 in this example), and if it is not complete, sets j=j+1 to retrieve the next input signal (here, x2) at step 206 and repeats steps 202 through 204. When this process is complete, flow A terminates at step 207. In actuality, the $\mu$-P 52 executes flow A cyclically at predetermined intervals of time, and at step 204, updates the first fuzzy grade numbers Aij stored in the two-port RAM 57. Details of the operation at major steps in flow A will be described below in accordance with FIGS. 2a, b and FIGS. 5a, b.

At step 202, with regard to the A/D conversion and fuzzy grade number conversion of the analog input signals by means of the membership functions in the A/D converter 50, the $\mu$-P 52 directs a command to the DEC 58, which closes one analog switch 53 by way of an output thereof, whereby the analog signal x1 is input from the input terminal 51 into the sample holder 54. The $\mu$-P 52 causes the sample holder 54 to hold its value, by means of another output from the DEC 58. The $\mu$-P receives the held output value at the A/D input port 52a included therein, converts the same into a digital value, makes the required scale and linearity conversions, and obtains a corresponding digital value. This operation is performed by the A/D conversion microprogram 55a using an established routine stored in the built-in ROM/RAM 55 of the $\mu$-P 52. The process so far is the same or essentially similar to prior art A/D conversion techniques.

Then, at step 203, flow A progresses to the execution of the microprogram 55b, i.e., the fuzzy grade conversion routine, whereby the digital value obtained above (digital value at full scale=100%) is converted into grade numbers by the membership functions a11 and a21. In the present example, as shown in FIG. 5a, in regard to the membership function a11, it is necessary only to find the intersection a11(x1) between value x1 and the straight line connecting points SPA112 and SPA113, which can be calculated from the following formula (1) and which will yield a first fuzzy grade number A11 for the input x1:

$$A11 = a11(x1) = \qquad (1)$$

$$\frac{P2(SPA113) - P2(SPA112)}{P1(SPA113) - P1(SPA112)} \cdot (x1 - P1(SPA113)) + P2(SPA113)$$

Similarly, for the membership function a21, the intersection of value x1 with the straight line connecting the two points SPA211 and SPA212 is found, which provides the following first fuzzy grade number A21:

$$A21 = a21(x1) = \qquad (2)$$

$$\frac{P2(SPA212) - P2(SPA211)}{P1(SPA212) - P1(SPA211)} \cdot (x1 - P1(SPA211)) + P2(SPA211)$$

In the above calculations, P1 and P2 are the coordinate values for the respective points, obtainable from the two-port RAM 57, as schematically seen in FIG. 26.

Since the membership functions a11 and a21 are represented by polygonal lines, it is apparent that whether the input x1 intersects either or neither of the polygonal lines is determined nonambiguously.

Figure 2B:
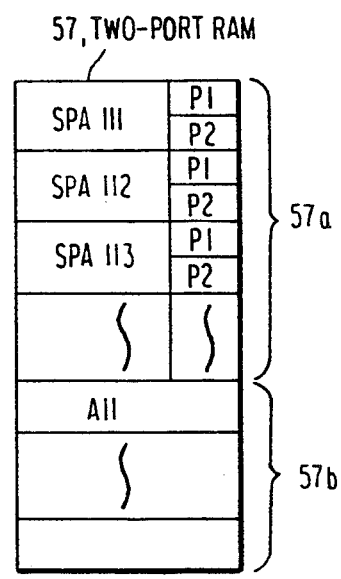

Then, at step 205, A11 (=a11(x1)) and A21 (=a21(x1)) obtained as indicated above are written, as first fuzzy grade numbers of the input x1 according to the membership functions a11 and a21, in a predetermined area 57b of the two-port RAM 57 as also shown in FIG. 2b.

Similarly, thereafter, steps 202 through 206 are repeated and the $\mu$-P 52 causes the DEC 58 to open the analog switch corresponding to the analog input x2, and causes the sample holder 54 to hold the x2 value, and then receives that value at the A/D input port 52a. The x2 value is converted into a digital value, and first fuzzy grade numbers A12 and A22 are found in correspondence with the membership functions a12 and a22 corresponding to the input x2. Fuzzy grade numbers A12 and A22 are obtained for the input x2 in a manner similar to that with respect to x1:

$$A12 = a12(x2) = \qquad (3)$$

$$\frac{P2(SPA123) - P2(SPA122)}{P1(SPA123) - P1(SPA122)} \cdot (x2 - P1(SPA122)) + P2(SPA122)$$

$$A22 = a22(x2) = \qquad (4)$$

$$\frac{P2(SPA221) - P2(SPA222)}{P1(SPA221) - P1(SPA222)} \cdot (x2 - P1(SPA222)) + P2(SPA222)$$

In a similar way, the other analog inputs (if any) of the A/D converter module are converted into fuzzy grade numbers in correspondence with the corresponding membership functions and the conversion results are written to the predetermined area 57b of the two-port RAM 57. The membership function definition area 57a corresponding to each analog input informs the $\mu$-P 52 of the end of each definition area with a predetermined mark at the termination of each definition.

The above conversion operation is performed cyclically by the A/D converter module 50. Where there are a plurality of A/D converter modules 50, the above conversion operation is carried out asynchronously and in parallel.

The operation in flow B of FIG. 4 will now be explained. The controller unit 40 is started up at step 300. When any of a plurality of pre-prepared fuzzy rule (hereinafter referred to simply as "rule") sets is selected at step 301, the PC-CPU 41 reads, at step 302, the first fuzzy grade numbers Aij (i=1 to n, j=1 to m) from storage in the two-port RAM 57 of the A/D converter module 50 and writes them in internal memory in the PC-CPU 41. At step 303, the PC-CPU 41 then executes the fuzzy operation processing instructions, i.e., performs a fuzzy inference operation which will later be described in detail, using the first fuzzy grade numbers Aij. Namely, instructions 102 to 105 in the sequence ladder diagram segment shown in FIG. 6 are executed in order and the second fuzzy grade numbers Ai (i=1 to n) are output. At step 304, the PC-CPU 41 then transfers the second fuzzy grade numbers Ai to a predetermined area 67b of the two-port RAM 67 in the I/F 66 of the D/A converter module 60 via the I/O bus 44, and terminates flow B at step 305. Flow B, however, is part of the application program, which is run cyclically by the PC-CPU 41, and is therefore executed cyclically. The principal steps of flow B will now be described in detail.

Figures 11, 12:
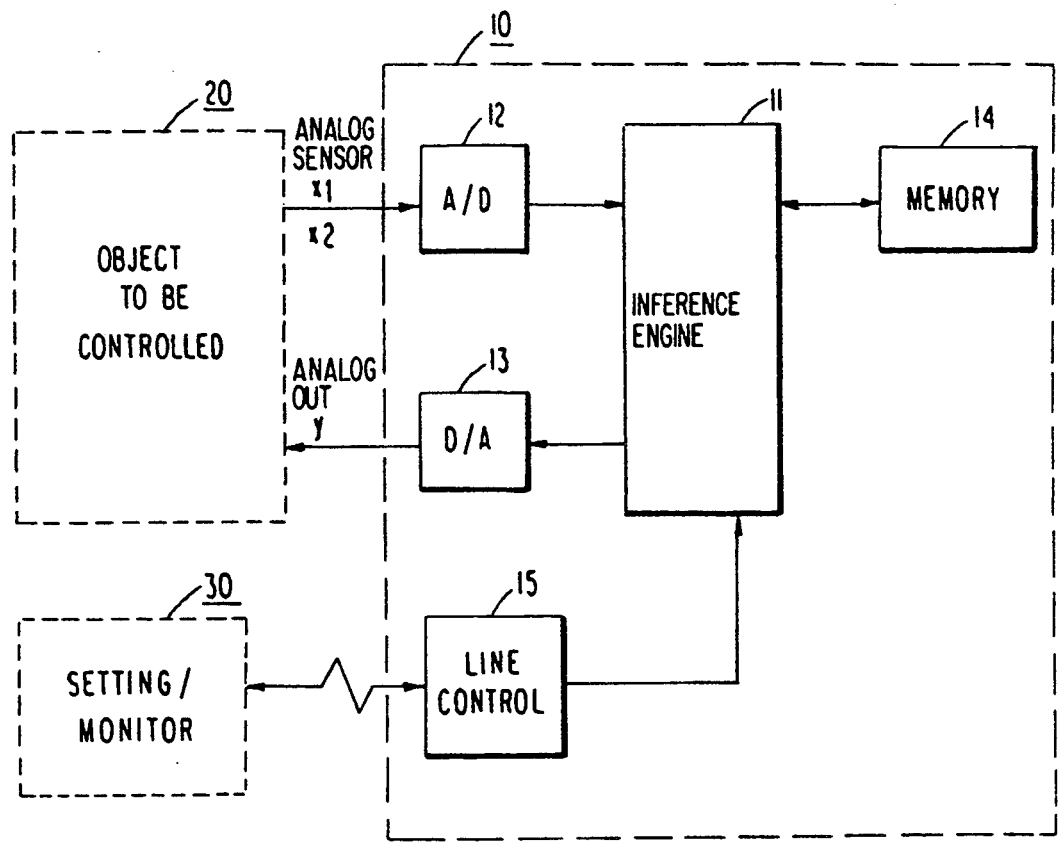
FIG. 11 is a block diagram illustrating a fuzzy controller of the prior art.
FIG. 12 is a diagram illustrating a set of fuzzy rules.
Figure 13C:
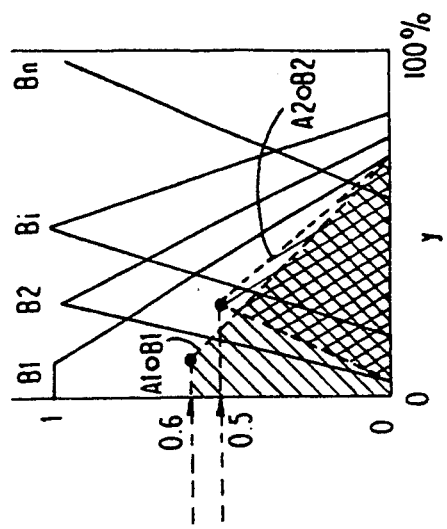
FIG. 13 is an illustrative diagram of a typical fuzzy grade number operation and implication operation in the prior art fuzzy controller.
Figure 13B:
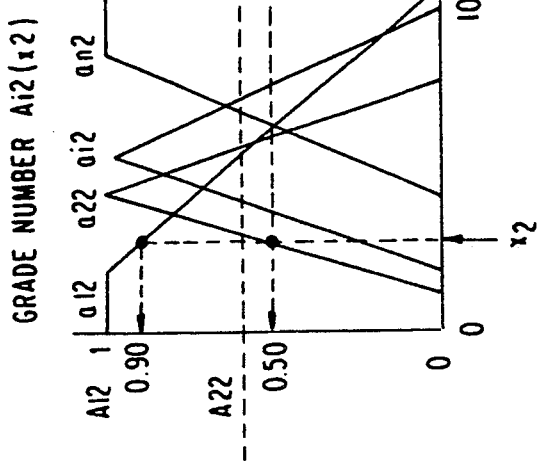
Figure 13A:
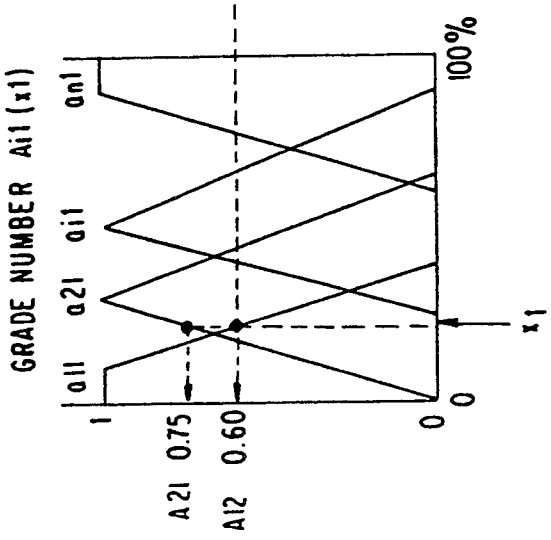
Figure 14:
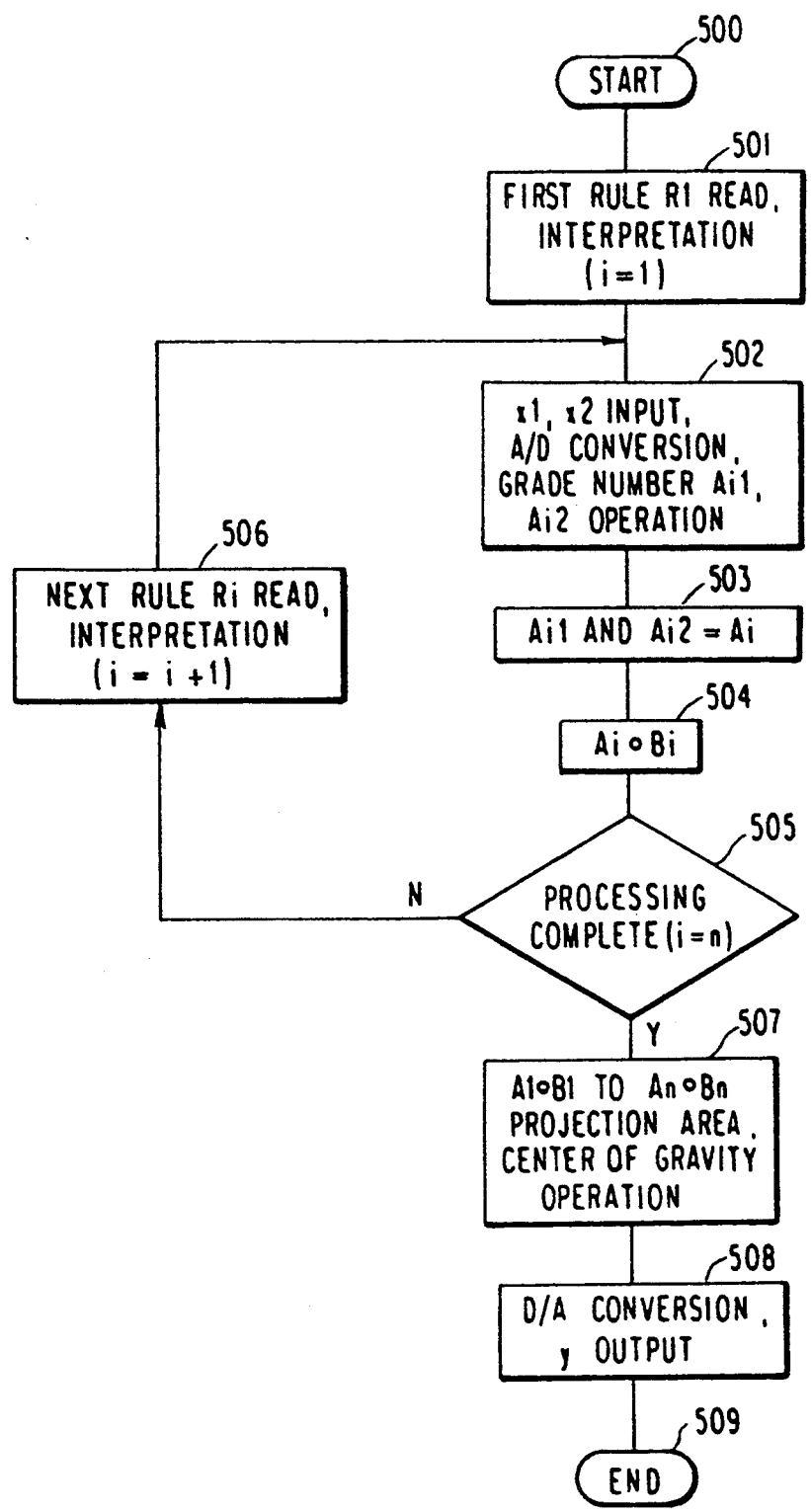
FIG. 14 is a flowchart illustrating the fuzzy control scheme of the prior art.

FIG. 6 is a segment of a sequence program illustrated in ladder diagram form which causes the PC-CPU 41 to execute the rules shown in FIG. 12. It is part of the application program(s) stored in the memory 42. Instructions 101 to 106 execute the rules R1 to Rn shown in FIG. 12. Relay M10 110 is a logical contact which acts as a conditional contact controlling the execution/non-execution of the rule sets, and is switched on/off in the application program area (not illustrated). Instructions 107 to 109 correspond to a part of another set of rules (not illustrated in full), like the rules shown in FIG. 12. Relay M11 111 controls the execution/non-execution of this group of rules.

The execution of the rule implementing instructions 101 to 106 will now be described, in comparison with the prior art.

Instruction 101 is the data transfer instruction of the PC-CPU 41 executed at the step 302 in FIG. 4, and operates to transfer data (groups of words in batches) from any specified data area of the two-port RAM 57 in the I/F 56 within the A/D converter module 50 to any specified data area (a data register in this example) within the PC-CPU 41. Namely, the instruction 101 transfers data from the addresses (known to the user) of the two-port RAM 57 which store the first fuzzy grade numbers A11, A21, ... An1, A12, A22, ... An2, to data registers in the PC-CPU specified by the user application.

At the instruction 101 in FIG. 6, FROM indicates a batch transfer instruction (an existing sequence application instruction) from any module (device) to the PC-CPU 41.

H10 indicates an address where a transfer destination module is being inserted (i.e., a device address) (H is a symbol representing a hexadecimal constant).

Kmi indicates an address on the two-port RAM; in this example, an address on the two-port RAM 57 in the A/D converter module (K is a symbol representing a decimal constant).

D11 indicates a transfer destination head address.

K2n indicates the number of words to be transferred (K is a decimal constant).

When the PC-CPU 41 executes the above instruction, the A11 value is stored into D11, A21 into D12, An1 into D10+n, ... A12 into D11+n, A22 into D12+n, ... and An2 into D10+2n.

Instruction 102 is a fuzzy AND instruction executed at step 303 and is differentiated from the usual AND instruction by the presence of the symbol ~, i.e., the fuzzy AND instruction is indicated by "~AND". The processing routine for this instruction is stored in the fuzzy inference instruction execution processor 43b of the internal memory 43 in the PC-CPU 41. The instruction performs the following fuzzy operation between the word resources at the three successive addresses:

Min S1, S2 ⟶ S3 at | ~AND | S1 | S2 | S3 |

Namely, the instruction 102 compares and takes the minimum of the contents of D11 and D11+n; i.e., in this example, a minimum value operation is performed on values A11 and A12, and the smaller value is stored at D11+2n as the second fuzzy grade number A1. Thereafter, similarly, ~AND instructions 103 through 105 are executed at step 303:

Instruction 103 performs a minimum value operation on the contents of D12 and D12+n, i.e., the values A21 and A22, and the smaller value is stored in D12+2n as A2.

Instruction 104 performs a minimum value operation on the contents of D10+i and D10+2i, i.e., the values Ai1 and Ai2, and the smaller value is stored in D10+3i as Ai.

Instruction 105 performs a minimum value operation on the contents of D10+n and D10+2n, i.e., the values An1 and An2, and the smaller value is stored at D10+3n as An.

Instruction 106 is a data transfer instruction of the PC-CPU 41, executed at step 304 of FIG. 4. It differs from the FROM instruction at instruction 101 in that the transfer direction is opposite, i.e., a batch transfer from any designated data area (a data register in this example) of the PC-CPU 41 to a designated area in any module (here, the two port RAM 67).

Specifically, in instruction 106, TO indicates a batch transfer instruction to transfer data from the PC-CPU 41 to any designated module (device). This is an existing sequence application instruction; its processing routine is stored in the microprogram 43a. H20 indicates an address where a transfer destination module is being inserted (a device address); a D/A converter module address in this example (H indicates a hexadecimal representation).

Km2 indicates an address on a two-port RAM in the destination module; in this example, an address value m2 on the two-port RAM in the D/A converter module 60 (K is a symbol representing a decimal constant). D11+2n indicates the transfer source head address. Note that the head address is that which was the target address of instruction 102.

Kn indicates the number of words to be transferred.

Namely, instruction 106 causes "n" pieces of word data, here A1 to An in memory areas D11+2n to D10+3n storing the fuzzy operation results, to be stored into RAM area 67b (FIG. 3b) at and after address m2 in the two-port RAM 67 of the D/A converter module 60. This completes step 304 in FIG. 4.

Referring again now to FIG. 4, the operation of flow C will now be described. The D/A converter module 60 is started at step 400 and initialized (n=1) at step 401. In a loop comprising steps 402 to 405, the μ-P 62 reads the second fuzzy grade numbers Ai (i=1 to n), which have been stored in memory area 67b after being transferred there by PC-CPU 41 of the controller unit 40 at step 304 of flow B. The pre-stored fuzzy output functions Bi (i=1 to n) are also obtained from the two-port RAM 67 in order. The μ-P 62 then performs implication operations Ai Bi (i=1 to n), and creates fuzzy result functions Ci (i=1 to n) in a definition format defined by three points (like the fuzzy output functions Bi). These fuzzy sets are the fuzzy results of the operation. Then, at step 406, the areas Si of the figures (see FIG. 5c) defined by the fuzzy result functions Ci are found, along with the horizontal axis (y axis) components li of their center of gravity. An area center of the composite fuzzy set obtained by overlapping the figures is determined, and the y axis value of the same (in %) is used as the defuzzy value obtained by defuzzing the composite fuzzy set, as explained in greater detail hereafter.

At step 407, the above defuzzy value is converted into an analog value and output as output y, and the flow C is terminated at step 408.

Like the operation of the A/D converter module 50 shown in flow A and that of the controller unit 40 in flow B, flow C is executed cyclically and independently, and data transfer between the flows is performed by the PC-CPU 41 in the controller unit 40 by accessing the two-port RAM 57 of the A/D converter module 50 and the two-port RAM 67 of the D/A converter module 60. The main steps of the flow C will now be detailed.

In FIG. 3, the D/A converter module 60 performs the defuzzy conversion via the following operation. Each fuzzy output function Bi has been specified by three definition points, which have been written to a predetermined area of the two-port RAM 67 in a given order.

At step 403 of FIG. 4, the μ-P 62 performs the implication operation Ai Bi on each of the second fuzzy grade numbers Ai (i=1 to n). That is, it first reduces the value of each fuzzy output function Bi (i=1 to n) in its vertical axis direction by a ratio set by the second fuzzy grade number Ai. That is, if the second fuzzy grade number Ai is 0.6, for example, the output function Bi will be reduced in the vertical direction to 60% of its original value. Next, μ-P 62 determines the area Si and the area center coordinate li (horizontal axis only) of the triangle defined by the resultant three points or the trapezoid defined by the three points and the vertical axis.

Then, at step 406, by weighting all of the area center coordinates li (i=1 to n) according to the size of the area Si of each figure, the μ-P 62 overlaps and composes them, and finds the horizontal axis coordinate value of the area center of the resultant composite fuzzy set, i.e., the defuzzy value y.

Figure 7:
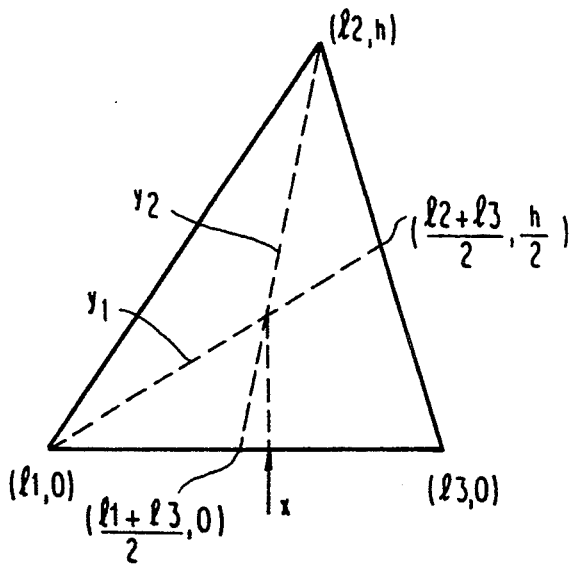
FIG. 7 to 9 are illustrative diagrams of the calculation method of defuzzy conversion.

FIG. 7 is an illustrative diagram showing the calculation method where the fuzzy output functions comprise triangles. If the triangle is composed of three points (l1, 0), (l2, h), (l3, 0), the area S and the position x of the area center are obtained as follows:

$$x = \tfrac{1}{3}(l1 + l2 + l3) \quad (5)$$

$$S = \tfrac{1}{2}(l3 - l1)h \quad (6)$$

Where h is the height of the triangle, here determined by the second fuzzy grade number Ai.

Figure 8:
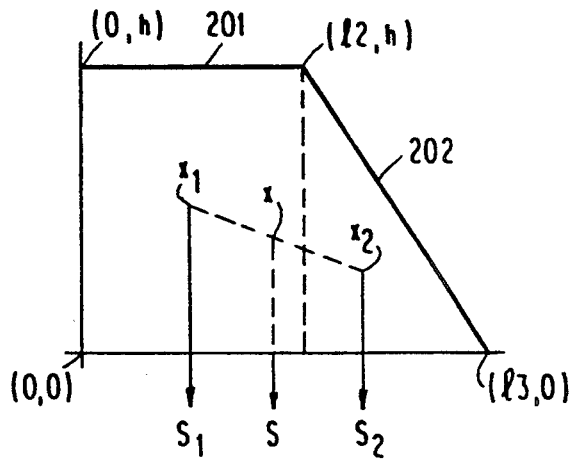

FIG. 8 is an illustrative diagram of the calculation method where the fuzzy output function comprises a trapezoid. If the trapezoid is composed of three points (0, h), (l2, h), (l3, 0) and the origin (0, 0), it is divided into a rectangle including the point (l2, h) and the origin (0, 0) and a triangle including the points (l2, h), (l3, 0), and the area S1 and the area center x1 of the rectangle are found by the following expressions:

$$S1 = l2h$$

$$x1 = l2/2$$

and the area S2 and the area center x1 of the triangle are found by the following expressions:

$$S2 = \tfrac{1}{2}(l3 - l1)h$$

$$x2 = \tfrac{1}{3}(2l2 + l3)$$

and the area S of the said trapezoid is obtained by adding the said areas S1 and S2, and the area center x is obtained by weighting the values x1 and x2 by the sizes of the respective areas S1 and S2, respectively, whereby the area center position x and the area S are obtained by the following expressions:

$$x = \frac{(l3^2 + l2l3 + l2^2)}{3(l2 + l3)} \quad (7)$$

$$S = 1/2h(l2 + l3) \quad (8)$$

Since the fuzzy output function Bi comprises a trapezoid in the example shown in FIG. 5c, the expressions (7) and (8) are used, and h = A1
l2 = P1 (SPB12)
l3 = P1 (SPB13)

are used in expressions (7) and (8) to find the area and its center position.

Since the fuzzy output function B2 comprises a triangle as shown in FIG. 4c, expressions (5) and (6) are used, and h = A2
l1 = P1 (SPB21)
l2 = P1 (SPB22)
l3 = P1 (SPB23)

are used in expressions (5) and (6) to find the area and the center position.

Figure 9:
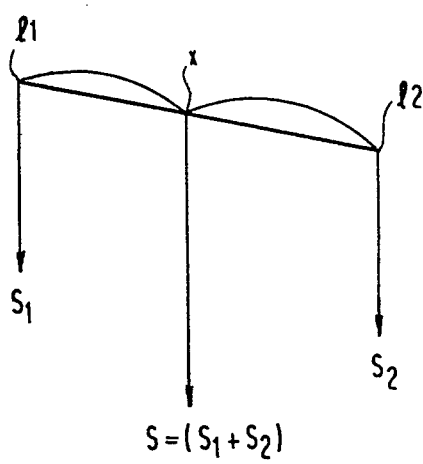

Then, a composite value of the moments, wherein the center positions found above are coordinate values and the area values are their relative magnitudes, is found according to FIG. 9, i.e., if the original areas and center positions are (Si, l1), (S2, l2), respectively, the composite center x and the composite area S are obtained by the following expressions:

$$x = \frac{S1l1 + S2l2}{S1 + S2} \quad (9)$$

$$S = S1 + S2 \quad (10)$$

In the present example shown in FIGS. 5, each center position and area of A1 □ B1 and A2 □ B2, as previously calculated, are used in the above expressions to obtain the composite center position and area.

In a similar way,

Ai □ Bi (i=3 to n)

is used to find the composite center position of plural areas greater than 2, if there are more Ai and Bi than A1, A2, B1, B2. Since the composite center position is a % output with respect to the horizontal axis, it is converted into an analog value in an ordinary way and output as the output y. Namely, the μ-P 62 outputs the D/A output value, i.e., the composite center position (the defuzzed value of the composite fuzzy set), to the D/A port 62a, holds the output at that one of the sample holders 64 made active by the output of the DEC 68, converts the same to low impedance by means of the corresponding amplifier 63, and outputs it to the corresponding analog signal output terminal 61 as an analog signal.

As described above, since the input conversion operation (using the fuzzy input membership functions), the fuzzy inference operation (using the main PC-CPU), and the calculation and processing of the area centers of the fuzzy result functions all proceed independently of and in parallel to each other, throughout is increased, speed is not compromised, and the addition of fuzzy inference processing to a sequence control operation allows the same CPU to cyclically carry out fuzzy control as a general PC control function. Moreover, by utilizing spare time made available by the concurrent processing of the fuzzy and defuzzy conversion operations as described above, fuzzy and defuzzy conversions can be performed by way of a numerical operation based on a coordinate based format using three coordinate values or so, instead of a look-up table system. Further, the integration of fuzzy control and sequence control in one PC allows more complex overall control.

The peripheral device 90 in FIG. 1 is capable of creating an application program including fuzzy operation processing instructions in addition to the usual sequence instructions of the prior art, and writes (or modifies) the same to the application memory 42 via the line controller 45 and the PC-CPU 41 in the controller unit 40, and also creates (or modifies) the membership functions and the fuzzy output functions in the three-point definition format and writes the same to the two-port RAMs 57, 67 of the A/D converter module 50 and the D/A converter module 60, respectively. Further, the peripheral device 90, reversely, is capable of reading the data stored in the application memory 42 and the two-port RAMs 56, 67, and the execution results of the PC-CPU 41 and the μ-Ps 52, 62; e.g., the sets of three points defining the membership functions, the fuzzy output functions and the fuzzy result functions, the first and second fuzzy grade numbers, and the defuzzy value of the composite fuzzy set, and indicating the same on the display. At such time, the functions are reproduced as graphic figures. Namely, the peripheral device 90 functions as a fuzzy monitoring device. This function is easily achieved by adding a fuzzy control monitoring program to the peripheral device 90 and executing the same on the CPU (not illustrated) of the peripheral device 90.

Figure 10:
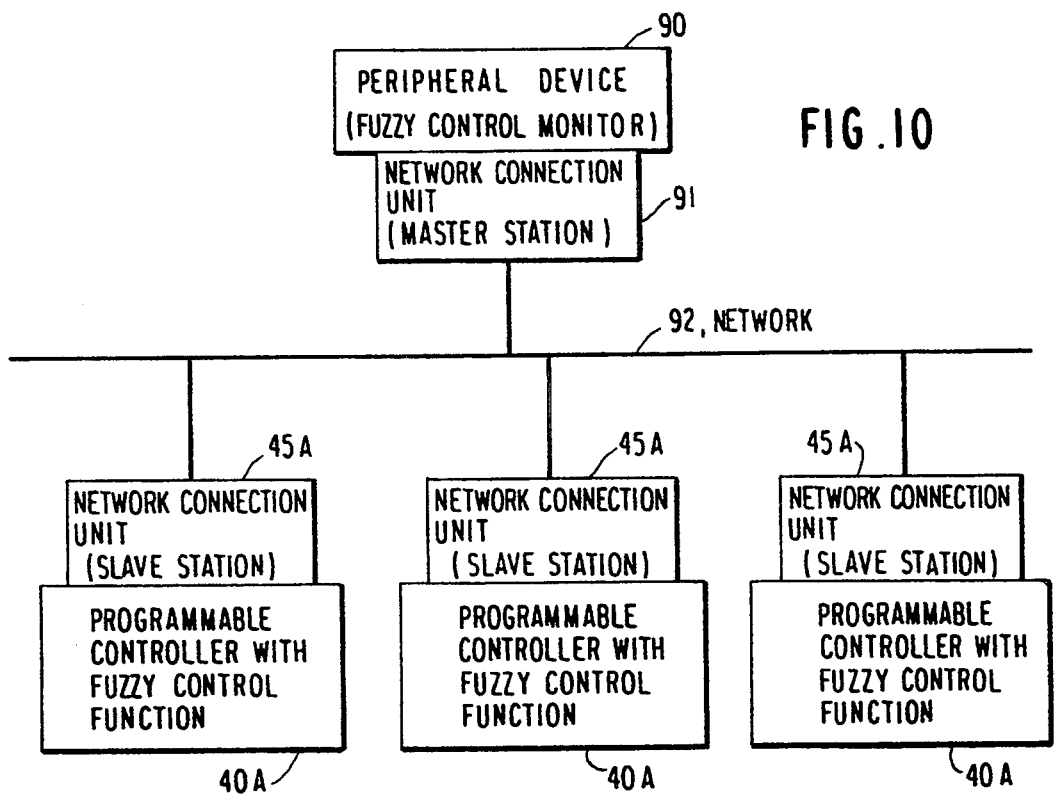
FIG. 10 is a diagram illustrating a monitoring process which takes place over a network.

FIG. 10 is a block diagram illustrating a circuit wherein one peripheral 90 provided as a fuzzy control monitoring device is equipped with a network connection unit 91 and connected with a plurality of CPUs 40A via a network 92. Referring to FIG. 10, one peripheral device 90 reproduces the fuzzy control status of any of the plurality of PCs on the display.

In the present invention, the fuzzy inference operation, which is executed between fuzzy grade numbers set in various registers using an added fuzzy inference instruction as a sequence instruction executed by the PC-CPU 41, is not limited to the minimum value operation (fuzzy AND) exemplified above. In addition to this, a maximum value operation (fuzzy OR) may be performed, as well as binary operations such as an m×n matrix operation, a maximum value/minimum value operation combination, etc., all of which may be represented and given an execution format in a sequence program.

The implication operation "A □ B" is performed by the D/A converter 60 in the above embodiment. That is, the three coordinate value sets defining the fuzzy output functions B are stored in the memory (the two-port RAM 67) of the D/A converter 60 and the said implication operation "A □ B" is executed by the D/A converter's μ-P 62. The implication operation, however, could be performed by the CPU 40 as are others of the fuzzy operations, in which case the fuzzy output functions B would be stored in the memory 42.

Moreover, a compound A/D module, wherein the A/D and D/A converters are operated by one microprocessor, may be used instead of the A/D converter module 50 and the D/A converter module 60 configured independently in the above described embodiment, to produce the same effect as independent converters.

Further, the functions needed to implement the fuzzy operation may be extracted and carried out by an additional second CPU or by separately provided dedicated unit, instead of using the existing PC-CPU 41 as in the present embodiment.

The definition format of the membership functions as described above may be retained while all control functions are concentrated in the single PC-CPU. In this case, the high speed achieved by the pipeline (parallel) system is sacrificed but there is still the advantage that a large of memory, as needed for a table-type look-up system, is not required in fuzzy or defuzzy conversion.

Naturally, more than three points may be employed for the definition of the membership functions, fuzzy output functions, etc.

Switching from one fuzzy inference rule or rule set to another may be achieved easily by controlling logical contacts M10 110 and M11 111, etc., as shown in FIG. 6. The logical contacts can be configured as physical contracts (relay coils, etc.) if desired.

It will be apparent that the invention, as described above, converts A/D-converted digital data into first fuzzy grade numbers using fuzzy membership functions defined by a format composed of a plurality of points, and executes fuzzy operation processing instructions to find second fuzzy grade numbers. The invention defuzzes the fuzzy sets resulting from operations on fuzzy output functions, defined by a plurality of points, using the second fuzzy grade numbers so as to provide a fuzzy control process for a programmable controller which requires a relatively small memory area to store the fuzzy membership functions and fuzzy output functions.

It will also be apparent that the invention can be designed to operate, independently of and in parallel, an A/D converter for computing first fuzzy grade numbers by means of fuzzy membership functions, a CPU for executing fuzzy operation processing instructions for the said first fuzzy grade numbers, and a D/A converter for defuzzing a composite fuzzy set. Further, the invention defines at least one of the fuzzy membership functions, fuzzy output functions and fuzzy result functions in a definition format composed of a plurality of points, so as to minimize the processing burden to the CPU, reconcile and efficiently execute the prior art sequence instructions and fuzzy operation processing instructions, and make the memory area for storing the functions comparatively small.

The invention is designed to monitor, on a fuzzy control monitoring device, the fuzzy control information of a programmable controller having a fuzzy control function comprising at least one of fuzzy membership functions, fuzzy output functions and fuzzy result functions defined in a format composed of a plurality of points, so as to allow the status of fuzzy control to be reproduced and observed. The invention can be designed to monitor the fuzzy control information of a plurality of programmable controllers with fuzzy control functions via a network, so as to allow the status of fuzzy control of the plurality of programmable controllers to be reproduced and observed on one fuzzy control monitoring device.

The invention further includes fuzzy rule setting means for setting fuzzy rules in the application programs and fuzzy rule selecting means for selectively executing the fuzzy rules by means of logical contracts in the said application program, so as to execute the fuzzy operation processing instructions efficiently. If desired, a first CPU can be provided for executing the fuzzy operation instructions, with a second CPU for executing sequence instructions other than fuzzy operation instructions, so as to execute the fuzzy operation processing instructions at high speed.

Finally, the invention includes a defuzzing means for obtaining a composite defuzzy value by the composite operation of moments, wherein the area of a fuzzy result function is used as the magnitude (for weighting) and the center of the area is used as a coordinate value, so as to perform the operation at high speed.

What is claimed is:

1. A fuzzy monitoring process for monitoring fuzzy control information of a programmable controller having a fuzzy control function and at least one of an input converting module and an output converting module, by using a fuzzy control monitoring device, comprising the steps of:
   defining at least one of fuzzy membership functions, fuzzy output functions and fuzzy result functions using a definition format comprising a plurality of points and storing data representing said at least one function in at least one of said input converting module and said output converting module;
   generating data including at least one of first fuzzy grade numbers, second fuzzy grade numbers and a composite fuzzy set based on said at least one function; and
   monitoring the production of said generated data using said monitoring device.

2. A fuzzy control monitoring process for monitoring fuzzy control information of a plurality of programmable controllers connected by a network and each having a fuzzy control function and at least one of an input converting module and an output converting module, by using a single fuzzy control monitoring device, comprising the steps of:
   defining at least one of fuzzy membership functions, fuzzy output functions and fuzzy result functions using a definition format comprising a plurality of points and storing data representing said at least one function in at least one of said input converting module and said output converting module of each of said plurality of programmable controllers;
   generating, for each of said programmable controllers, data including at least one of first fuzzy grade numbers, second fuzzy grade numbers and a composite fuzzy set based on a respective said at least one function; and
   monitoring the production of said generated data of said plurality of programmable controllers using said single fuzzy control monitoring device.

* * * * *